2,719,835
NITROGEN-CONTAINING LINEAR POLYESTERS

Robert L. Sublett, Decatur, Ala., assignor to The Chemstrand Corporation, Decatur, Ala., a corporation of Delaware No Drawing. Application July 30, 1954,
Serial No. 446,955

14 Claims. (Cl. 260—75)

This invention relates to a new process for producing linear condensation polyesters. More particularly the invention is concerned with a method of producing synthetic linear condensation polyesters, which are fiber- and filament-forming and the filaments produced therefrom, possess the property of cold drawing.

The simplest form of polymer-containing ester linkages is the polyester and it is well-known that linear polyesters can be made from dibasic acids and glycols. When these polyesters are in a highly polymerized condition, they can be formed into filaments, fibers, and the like, which can be permanently oriented by cold drawing. That is, when the esterification reaction is carried out for a sufficiently prolonged period under conditions such as to remove the water of reaction effectively, linear polyesters may be produced having extremely high molecular weights, which, in the case of polyesters capable of crystallizing at ordinary temperatures, may possess the property of cold drawing. The non-crystalline polyesters of high molecular weight are viscous liquids at ordinary temperatures whereas the crystallizable polyesters are hard, tough microcrystalline substances which melt at a definite crystalline melting point to form viscous liquids.

When preparing a polyester from a dibasic acid and a glycol the reaction takes place in two stages. In the first stage an intermediate product is formed, which is an hydroxyalkyl derivative of the dibasic acid, and water is evolved. In the second stage a simple molecule, such as water or glycol, is evolved forming the polyester. High temperatures are necessary to effect the first stage of the reaction and the reaction mass must be maintained at these elevated temperatures for considerable lengths of time. These factors have led to discoloration of the polyester, which obviously is undesirable when producing filaments and fibers for commercial use. In addition, the prolonged periods of time necessary to effect reaction are not conducive to continuous production, which is desirable when operating on a commercial scale. It is desirable, therefore, to provide a method of producing synthetic linear condensation polyesters which have improved color, or lack of color, and are more suitable commercially for the production of fibers, filaments, films, molded articles, and the like.

Accordingly, it is an object of the present invention to provide a new and improved process for producing synthetic linear condensation polyesters. It is another object of the invention to provide a new and improved process for producing polyesters which are capable of being formed into filaments, fibers, and the like, and which, when cold drawn, show permanent orientation along the fiber axis, as revealed by characteristic X-ray patterns. It is still another object of the invention to provide a new and improved process for producing synthetic linear condensation polyesters in which there is a reduction in time during which reaction takes place and which alleviates discoloration of the polyester. It is a further object of the invention to provide a new and improved process for producing synthetic linear condensation polyesters which is more economical than prior processes and which is conducive to continuous operation. Other objects and advantages of the present invention will be apparent from the description thereof hereinafter.

In copending application, Serial No. 446,962, filed on even date herewith, there is described and claimed a procedure for purifying aromatic dicarboxylic acids by recrystallization from N-methylpyrrolidone, 1,5-dimethylpyrrolidone, N-methylpiperidone or N-methylcaprolactam. After dissolving the acid to be purified in one of the aforementioned solvents and cooling the solution, a salt or complex, formed between the acid and the solvent, is precipitated. It has unexpectedly been found that this salt can be reacted directly with ethylene glycol to form the polyester.

Accordingly, the objects of the present invention are in general accomplished by reacting ethylene glycol with a salt or complex formed by the reaction between terephthalic acid and N-methyl-2-pyrrolidone, 1,5-dimethylpyrrolidone, N-methylpiperidone or N-methylcaprolactam. Alternatively, the salt or complex may be formed in situ. That is, the terephthalic acid and the N-methyl-2-pyrrolidone are added separately to the reaction vessel containing glycol and the salt or complex is formed in the vessel.

In the preparation of synthetic linear condensation polyesters from terephthalic acid and ethylene glycol, the terephthalic acid and glycol are mixed together and heated in the presence or absence of esterification catalysts, as desired. It is necessary to employ at least one molecular proportion of the glycol per molecular proportion of terephthalic acid. Generally, however, higher proportions of the glycol relative to the terephthalic acid are used. For example, up to 6 moles of glycol per mole of terephthalic acid are employed because by so doing, the initial esterification is said to take place more readily. However, even at this upper ratio of 6 moles of glycol per mole of terephthalic acid the time of reaction is prohibitive for continuous operation, since a minimum of approximately 5 to 8 hours is necessary to complete the first or initial esterification reaction whereby the glycol ester of the terephthalic acid is formed. By employing the salts or complexes of the instant invention in place of terephthalic acid, the time for effecting the initial esterification is cut to approximately ¼ the time required when using terephthalic acid. The time of reaction will vary with the temperature of the reaction and the molar ratio of the complex to glycol.

In the practice of the present invention the molar ratio of the salt or complex to ethylene glycol may vary within the range of 1:1 to 1:12. In the first stage reaction, temperatures within the range of 180° C. to 280° C. may be employed. Of course, choice of conditions will depend upon the molecular weight desired in the finished product and the use to which such product is to be put, e. g., whether for the manufacture of fibers, filaments, films, molded articles, etc. Usually when producing filaments which are capable of being cold drawn, a molar ratio of terephthalic acid complex to ethylene glycol of about 1:2 to 1:12 and a temperature in the range, as defined above, in the first stage, is satisfactory.

During the first stage of the reaction, after all of the terephthalic acid complex has reacted with the glycol, excess glycol, if any, is removed by distillation. Thereafter, the residue is further heated above its melting point. This is known as the second stage of the reaction and the one in which condensation takes place forming the linear condensation polyester.

During the second stage of the reaction, glycol is liberated and the melting point and the viscosity of the reaction mixture gradually increase. When it is desired to produce filaments and fibers from the polyester, the heating is continued until the melt produced has cold-drawing properties, i. e., filaments formed from the melt are capable of being cold drawn. The heating may be carried out at atmospheric or sub-atmospheric pressures, and preferably in an inert atmosphere in the absence of an oxygen-containing gas. This may be accomplished by bubbling an inert gas, such as nitrogen, carbon dioxide, etc., through the molten mass. Any inert gas may be employed.

The glycol liberated in the second stage is removed by any convenient means, such as distillation, and the like. In the second stage, the mass is heated above the melting point thereof, which will vary with the nature of the polymer or intermediate product obtained. The temperature is maintained throughout the second stage at a point sufficiently high to maintain a molten mass in the reaction vessel.

If desired, esterification catalysts may be employed during the first stage and also, during the second stage. The usual known catalysts may be employed, such as p-toluenesulfonic acid, camphorsulfonic acid, zinc and like metals, etc.

While the exact chemical structure of the terephthalic acid salts or complexes, useful in the practice of the present invention, is not known, experimental work has established that they contain one mole of terephthalic acid and two moles of N-methylpyrrolidone, 1,5-dimethylpyrrolidone, N-methylpiperidone, or N-methylcaprolactam. It is believed, however, that the substances are oxonium salts of terephthalic acid and their structure is believed to be as follows:

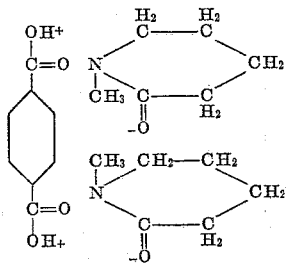

Each of the other compounds listed would combine in like manner with terephthalic acid and have a structure as pointed out above.

When employing the alternative procedure of the instant invention, i. e., when forming the terephthalic acid complex or salt in situ or in the reaction vessel by adding the ingredients separately to the vessel, the same desirable results are achieved and there is a substantial reduction in time of the first stage reaction. The presence of even minor amounts of the terephthalic acid complex in the reaction vessel causes a decrease in the time for the first stage reaction. The complex is formed upon the addition of N-methyl-2-pyrrolidone, or like solvent named hereinbefore, to a mixture of terephthalic acid and ethylene glycol. This is evidenced by the fact that terephthalic acid is insoluble in glycol and forms a dispersion therein. Upon the addition of N-methyl-2-pyrrolidone, a slow solubilizing effect on the terephthalic acid is noted, indicating that the terephthalic acid-N-methyl-2-pyrrolidone complex or salt is formed which is soluble in ethylene glycol. Data given hereinafter in connection with the specific examples shows that even minor amounts of the salt cause reduction in first stage reaction time. It is to be noted that the molar ratio ranges and temperature ranges, given hereinbefore, are likewise true for the alternative procedure wherein the salt or complex is formed in situ.

Further details of the present invention are set forth in the following specific examples, which are merely intended to be illustrative and not limitative. Unless otherwise indicated, all parts and percents are by weight.

Example I

A mixture of 4 parts of terephthalic acid complex (2 moles N-methyl-2-pyrrolidone and 1 mole terephthalic acid) and 8 parts of ethylene glycol was heated at 222° C. with nitrogen introduction in a glass reaction vessel set in a liquid heating bath. After heating for 90 minutes, a clear, almost colorless solution resulted. Thereafter the temperature of the solution was elevated to 280° C. and maintained at that temperature for a period of two hours. During this second stage, nitrogen was introduced into the reaction vessel. Upon cooling, the melt obtained solidified and the polyethylene terephthalate had a high molecular weight and good color and yielded filaments on drawing at normal temperatures.

Example II

A mixture of 4 parts of terephthalic acid complex (2 moles N-methyl-2-pyrrolidone and 1 mole terephthalic acid) and 8 parts of ethylene glycol was heated as in Example I at a temperature of 280° C. Complete solution occurred in 60 minutes. The solution was then heated two hours at 280° C. with nitrogen introduction. The polyethylene terephthalate obtained on cooling had good color and a high molecular weight. The polymer yielded filaments on drawing at normal temperatures.

Example III

A mixture of 4 parts of terephthalic acid complex (2 moles N-methyl-2-pyrrolidone and 1 mole terephthalic acid) and 16 parts of ethylene glycol was heated as in Example I at a temperature of 280° C. Complete solution occurred in 60 minutes. After heating the solution for two hours at 280° C. with nitrogen introduction there resulted a high molecular weight polymer of good color which yielded filaments on drawing at normal temperatures. For purposes of comparison, the same procedure was followed using an initial mixture of 4 parts of terephthalic acid and 16 parts of ethylene glycol. Solution did not occur until 270 minutes of heating at 280° C. This is more than 4 times as long as when employing the terephthalic acid-N-methyl-2-pyrrolidone complex.

Example IV

Using the procedure outlined in Example I, a mixture of 5 parts of terephthalic acid complex (2 moles N-methylcaprolactam and 1 mole terephthalic acid) and 10 parts of ethylene glycol was heated at 222° C. Complete solution occurred in 20 minutes. Polyethylene terephthalate of high molecular weight results on heating at 280° C. for two hours with nitrogen introduction.

Example V

A series of runs were made to ascertain the effect of varying the molar ratio of salt or complex to ethylene glycol. In all of these experiments, the procedure as outlined in Example I was employed. A control sample, for purposes of comparison, was prepared from terephthalic acid and ethylene glycol. In all instances, with the exception of the control sample, the terephthalic acid complex with N-methyl-2-pyrrolidone was employed. The data obtained are tabulated in the following table:

TABLE 1

| Parts Complex | Parts Glycol | 1st Stage Reaction Temp., ° C. | Time for Complete Solution, Min. | Color or Polymer |
|---|---|---|---|---|
| Control—Terephthalic Acid: | | | | |
| 5 | 10 | 222 | 300 | Good. |
| 4 | 8 | 222 | 90 | White. |
| 10 | 3.6 | 222 | 90 | Do. |
| 10 | 2.7 | 222 | 75 | Good. |
| 10 | 1.8 | 222 | 60 | Do. |
| 10 | 10 | 222 | 90 | Good White. |
| 10 | 20 | 222 | 90 | Do. |

It can readily be seen from the above data that the use of the complex, rather than the acid per se, greatly shortens the time of the first stage reaction, even though varying proportions of glycol are employed with respect to the complex or salt.

*Example VI*

A series of runs were made to compare the alternative procedure of the instant invention, wherein the salt or complex of terephthalic acid is formed in situ, i. e., is formed in the reaction vessel in the presence of ethylene glycol, with the standard procedure of reacting terephthalic acid and ethylene glycol. Here again, the procedure, as outlined in Example I, was employed. The control is the same as that shown in Table 1 above. Also in this series of runs, the effect of decreasing the amount of N-methyl-2-pyrrolidone was studied. The data obtained are tabulated below:

TABLE 2

| Parts Terephthalic Acid | Parts N–methyl-2-Pyrrolidone | Parts Glycol | 1st Stage Reaction Temp., °C. | Time for Complete Solution, Min. |
|---|---|---|---|---|
| Control: | | | | |
| 5 | | 10 | 222 | 300 Min. |
| 5 | 10 | 10 | 222 | 70 Min. |
| 5 | 5 | 10 | 222 | 150 Min. |
| 5 | 1 | 10 | 222 | 240 Min. |
| 5 | 0.1 | 10 | 222 | >240 Min. |

The above data show that even minor amounts of the salt or complex result in a shortening of the first stage reaction time.

*Example VII*

A mixture of 4 parts of terephthalic acid complex (2 moles, 1,5-dimethylpyrrolidone and 1 mole terephthalic acid) and 1.9 parts of ethylene glycol was heated at 222° C. with nitrogen introduction in a glass reaction vessel set in a liquid heating bath. The molar ratio was 4 moles glycol to 1 mole of complex or salt. After heating for 60 minutes, a clear, light straw-colored solution resulted. Thereafter the temperature of the solution was elevated to 280° C. and maintained at that temperature for a period of two hours. Nitrogen was introduced into the vessel during this second stage and the glycol formed during the reaction was removed by distillation. Upon cooling, the melt obtained solidified and the polyethylene terephthalate obtained had a high molecular weight and yielded filaments on drawing at normal temperatures.

The synthetic linear condensation polyesters, produced in accordance with the instant new process, have their greatest utility in the filament-and-fiber-forming art. The filaments may be formed by extrusion or by drawing directly from the polymer melt after the completion of the heating (second stage) or after remelting, if desired. Any suitable apparatus may be employed in forming the fibers and filaments.

Filaments, produced from the polyesters prepared in accordance with the present invention, can be cold-drawn to as much as several times their original lengths. These cold-drawing operations may be carried out on filaments, which have been allowed to cool fully and solidify, or the cold-drawing may follow the formation of the filaments directly as one part of a continuous process. In this regard, it should be pointed out that the instant process lends itself to continuous operation due to the great decrease in time to effect the first stage reaction which in turn results in an overall reduction in time to effect condensation or production of the polyesters over processes employed heretofore.

In the cold-drawing operation any suitable apparatus and process may be used. For example, the filaments may be wound from one roller to another with the second roller rotating at a higher speed than the first roller, i. e., the second roller may be rotated at a speed up to about four or five times that of the first roller. If desired, cold-drawing may be effected by employing a snubbing pin.

The term "cold-drawing," as used herein, includes, in addition to drawing filaments at temperatures as low as 0° C., warming the filaments to facilitate stretching, for example, by passing the filaments through warm or hot water or steam before and/or during the cold-drawing operation or drawing the filaments at any temperature below the melting point thereof.

Further, the linear condensation polyesters obtained according to the process of the present invention may be formed into other useful shaped articles. For example, the melt of the highly polymeric linear polyester may be formed into films and moldings by conventional procedures and apparatus. In addition, the polyesters may be used for hot melt coatings or as adhesives, plasticizers, binders for coating compositions or bonding materials for laminated fabrics.

Not only is the instant invention advantageous from the standpoint of shorter time of reaction, but the same is simpler in operation and more economical than prior art methods. Molecular weights of the same order of magnitude are possible by means of the instant invention as has been possible heretofore. Numerous other advantages of the present invention will be apparent to those skilled in the art.

It is to be understood that changes and variations may be made without departing from the spirit and scope of the invention as defined in the appended claims.

I claim:

1. In the manufacture of synthetic linear condensation polyesters, the steps comprising, heating and reacting a mixture comprising the salt formed by the reaction of terephthalic acid and a compound selected from the group consisting of N-methyl-2-pyrrolidone, 1,5-dimethylpyrrolidone, N-methylpiperidone and N-methylcaprolactam, and ethylene glycol, said salt and glycol being present in the mixture in a molar ratio in the range of 1:1 to 1:12, and continuing the heating to form the polyester.

2. The process for producing synthetic linear condensation polyesters as defined in claim 1 wherein the salt is added to the ethylene glycol.

3. The process for producing synthetic linear condensation polyesters as defined in claim 1 wherein the salt is formed in situ in the reaction vessel by adding terephthalic acid and the compound separately to the ethylene glycol in the reaction vessel.

4. The process defined in claim 1 wherein the compound is N-methyl-2-pyrrolidone.

5. The process defined in claim 1 wherein the compound is 1,5-dimethylpyrrolidone.

6. The process defined in claim 1 wherein the compound is N-methyl-piperidone.

7. The process defined in claim 1 wherein the compound is N-methyl-caprolactam.

8. In the manufacture of synthetic linear condensation polyesters the steps comprising, heating and reacting at a temperature in the range of 180° C. to 280° C. a mixture comprising the salt formed by the reaction of terephthalic acid and a compound selected from the group consisting of N-methyl-2-pyrrolidone, 1,5-dimethylpyrrolidone, N-methylpiperidone and N-methylcaprolactam, and ethylene glycol, said salt and glycol being present in the mixture in a molar ratio in the range of 1:1 to 1:12, and thereafter continuing the heating at a temperature sufficient to maintain the mass in a molten state until filaments produced from the mass possess the property of cold-drawing.

9. The process for producing synthetic linear condensation polyesters as defined in claim 8 wherein the salt is formed in situ in the reaction vessel by adding terephthalic acid and the compound separately to the ethylene glycol in the reaction vessel.

10. The process for producing synthetic linear condensation polyesters as defined in claim 8 where the salt is added to the ethylene glycol.

11. The process defined in claim 8 wherein the compound is N-methyl-2-pyrrolidone.

12. The process defined in claim 8 wherein the compound is 1,5-dimethyl-pyrrolidone.

13. The process defined in claim 8 wherein the compound is N-methyl-piperidone.

14. The process denfied in claim 8 wherein the compounds is N-methyl-caprolactam.

References Cited in the file of this patent

UNITED STATES PATENTS 2,664,440    Toland  ---------------- Dec. 29, 1953

FOREIGN PATENTS 914,066    Germany  ------------ June 24, 1954